US009414301B2

United States Patent
Huang et al.

(10) Patent No.: US 9,414,301 B2
(45) Date of Patent: Aug. 9, 2016

(54) NETWORK ACCESS SELECTION BETWEEN ACCESS NETWORKS

(71) Applicant: Telefonaktiebolaget L M Ericsson (Publ), Stockholm (SE)

(72) Inventors: Kaiyuan Huang, Kanata (CA); Gary Tam, Hong Kong (HK); Stephen Rayment, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/042,493

(22) Filed: Sep. 30, 2013

(65) Prior Publication Data

US 2014/0323087 A1 Oct. 30, 2014

Related U.S. Application Data

(60) Provisional application No. 61/816,301, filed on Apr. 26, 2013.

(51) Int. Cl.
*H04W 72/00* (2009.01)
*H04W 48/16* (2009.01)
(Continued)

(52) U.S. Cl.
CPC .............. *H04W 48/16* (2013.01); *H04W 36/16* (2013.01); *H04W 48/18* (2013.01); *H04W 48/20* (2013.01); *H04W 60/00* (2013.01)

(58) Field of Classification Search
CPC ....... H04W 4/16; H04W 60/00; H04W 36/16; H04W 48/20; H04W 48/18
See application file for complete search history.

(56) References Cited

U.S. PATENT DOCUMENTS 5,241,685 A * 8/1993 Bodin et al. .................. 455/453
6,112,093 A * 8/2000 Nordlund .............. H04W 48/18
370/332
(Continued)

FOREIGN PATENT DOCUMENTS

EP 2475109 A1 7/2012
EP 2840815 A1 2/2015
(Continued)

OTHER PUBLICATIONS

AT&T, et al., "WLAN-NS Key Issue #4—Solution", SA WG2 Meeting #96, Apr. 8, 2013, pp. 1-2, San Diego, California, USA, S2-131426.
(Continued)

*Primary Examiner* — Ronald Eisner
(74) *Attorney, Agent, or Firm* — Coats & Bennett, PLLC

(57) ABSTRACT

WI-FI/3GPP access selection techniques are used to control selection by a user terminal between cellular network cells and WI-FI cells. Cellular network cells providing overlapping coverage with WI-FI cells are correlated with the WI-FI cells. A received signal strength threshold is determined for each WI-FI cell based on an average throughput of the cellular network cells correlated with the WI-FI cell. The WI-FI user terminal admit threshold is used to control the effective coverage of the WI-FI cell. A user terminal operating within a cellular network cell is admitted to a WI-FI only if it is within the effective coverage area of the WI-FI cell as determined by the received signal strength threshold. Increasing the threshold shrinks the effective coverage area of the WI-FI cell to allow user terminal only of strong RSSI to make connection to the Cell, and steers user terminal of weak RSSI away from the WI-FI cell. In contrary, decreasing the threshold expands the effective coverage area of the WI-FI cell and effectively allows more user terminal making connection to the WI-FI cell.

40 Claims, 12 Drawing Sheets

(51) Int. Cl.
*H04W 48/18* (2009.01)
*H04W 60/00* (2009.01)
*H04W 36/16* (2009.01)
*H04W 48/20* (2009.01)

(56) References Cited

U.S. PATENT DOCUMENTS

| | | | |
|---|---|---|---|
| 6,381,458 B1* | 4/2002 | Frodigh | H04W 36/18 455/442 |
| 6,567,670 B1* | 5/2003 | Petersson | H04W 36/0083 370/331 |
| 6,985,739 B2* | 1/2006 | Spaling | H04W 24/08 370/310 |
| 7,668,946 B1 | 2/2010 | Garcia-Granco et al. | |
| 8,014,776 B2* | 9/2011 | Nylander | H04W 16/32 455/426.1 |
| 8,374,090 B2 | 2/2013 | Morrill et al. | |
| 8,626,213 B2* | 1/2014 | Frenger | H04L 5/0082 455/501 |
| 2004/0152422 A1* | 8/2004 | Hoglund et al. | 455/67.11 |
| 2007/0192065 A1 | 8/2007 | Riggs et al. | |
| 2008/0049615 A1 | 2/2008 | Bugenhagen | |
| 2010/0063715 A1 | 3/2010 | Wynter et al. | |
| 2011/0170418 A1* | 7/2011 | Sagfors | H04W 36/0083 370/241 |
| 2011/0310852 A1* | 12/2011 | Dimou | H04W 36/08 370/332 |
| 2012/0108245 A1* | 5/2012 | Zhang et al. | 455/443 |
| 2012/0140651 A1 | 6/2012 | Nicoara et al. | |
| 2012/0297055 A9 | 11/2012 | Raleigh | |
| 2012/0320888 A1 | 12/2012 | Annamalai et al. | |
| 2013/0060964 A1 | 3/2013 | Shahar | |
| 2013/0077482 A1 | 3/2013 | Krishna et al. | |
| 2013/0077599 A1 | 3/2013 | Dimou et al. | |
| 2013/0084864 A1* | 4/2013 | Agrawal | H04W 36/0083 455/436 |
| 2013/0217435 A1* | 8/2013 | Tarraf et al. | 455/552.1 |
| 2014/0064158 A1* | 3/2014 | Timus | H04W 36/30 370/279 |
| 2014/0086226 A1 | 3/2014 | Zhao et al. | |
| 2014/0094142 A1 | 4/2014 | Torres et al. | |
| 2014/0135018 A1* | 5/2014 | Hedberg | H04W 48/20 455/437 |
| 2014/0192727 A1* | 7/2014 | Liu | H04W 28/18 370/329 |
| 2014/0211626 A1 | 7/2014 | Liu | |
| 2014/0324371 A1* | 10/2014 | Huang | H04L 43/067 702/64 |
| 2014/0349611 A1 | 11/2014 | Kant et al. | |
| 2014/0349647 A1* | 11/2014 | Chen | H04W 36/30 455/436 |

FOREIGN PATENT DOCUMENTS

| | | |
|---|---|---|
| WO | 2010124138 A1 | 10/2010 |
| WO | 2011028258 A2 | 3/2011 |
| WO | 2012022965 A2 | 2/2012 |
| WO | 2012149954 A1 | 11/2012 |
| WO | 2013050070 A1 | 4/2013 |
| WO | 2013155916 A1 | 10/2013 |

OTHER PUBLICATIONS

Papadopouli, M., et al., "Evaluation of short-term traffic forecasting algorithms in wireless networks", 2nd Conference on Next Generation Internet Design and Engineering, NGI '06, Apr. 3, 2006, pp. 102-109, Valencia, Spain, XP010935442.

Papadopouli, M., et al., "Short-Term Traffic Forecasting in a Campus-Wide Wireless Network", 2005 IEEE 16th International Symposium on Personal, Indoor and Mobile Radio Communications, Sep. 11, 2005, pp. 1446-1452, Piscataway, New Jersey, XP032391733.

Ericsson, et al., "WLAN/3GPP Radio Interworking—More on Idle and Connected mode", 3GPP TSG-RAN WG2 #82, Fukuoka, Japan, May 20, 2013, pp. 1-10, Tdoc R2-131886, 3GPP.

Kocera Corp., "Additional Use cases involving WLAN", 3GPP TSG RAN WG3 Meeting # 84, Seoul, REpublic of Korea, May 19, 2014, pp. 1-4, R3-141293, 3GPP.

Intel Corporation, "Performance benefits of RAN level enhancements for WLAN/3GPP", 3GPP TSG-RAN WG2 Meeting #83bis, Ljubljana, Slovenia, Oct. 7, 2013, pp. 1-10, R2-133604, 3GPP.

* cited by examiner

NETWORK ACCESS SELECTION BETWEEN ACCESS NETWORKS

RELATED APPLICATION

This application claims priority to U.S. Provisional patent Application Ser. No. 61/816,301 filed Apr. 26, 2013, the entire contents of which are incorporated herein by reference.

TECHNICAL FIELD

The disclosure relates generally to wireless communications and, more particularly, to controlling selection by a user terminal between two access networks, such as a cellular network and wireless local area network.

BACKGROUND

Wireless user terminals, such as smartphones, tablets, and laptop computers, are designed to favor a Wireless Fidelity (WI-FI) connection as opposed to a cellular network connection. Whenever a user terminal is able to connect to a WI-FI cell in a Wireless Local Area Network (WLAN), it will automatically switch its network connection for Internet services to the WLAN from the cellular network such as a Third Generation Partnership Project (3GPP) network. This approach helps offload data traffic from the cellular network and is used by most cellular phones on the market.

This network selection bias favoring WLAN does not always provide the user with the best possible service. It does not take into consideration the network conditions for the two types of access networks (WLAN and cellular). Even when the WI-FI cell is very congested and the cellular network is lightly loaded, the user terminal will still select the WI-FI cell. Similarly, when a user terminal is further away from a WI-FI cell with marginal signal quality and the quality of service with WI-FI is poor, the user terminal will still connect through the WI-FI cell even though the cellular network can provide better service (e.g., higher data throughput).

SUMMARY

This disclosure describes techniques for controlling access selection by a user terminal between first and second access networks. In one exemplary embodiment, the access selection techniques are applied to control selection by a user terminal between a cellular network and a WLAN. Cellular network cells providing overlapping coverage with WI-FI cells in the WLAN are correlated with the WI-FI cells. A Received Signal Strength Indicator (RSSI) threshold is determined for each WI-FI cell based on an average throughput of the cellular network cells correlated with the WI-FI cell. The WI-FI RSSI Admit threshold is used to control the effective coverage area of the WI-FI cell. A user terminal operating within a cellular network is admitted to a WI-FI cell only if it is within the effective coverage area of the WI-FI cell as determined by the RSSI threshold. Increasing the threshold shrinks the effective WI-FI cell coverage area and turns user terminal of weaker signal strength away from the WI-FI Cell. Decreasing the threshold expands the effective WI-FI cell coverage area and moves user terminal of weaker signal strength towards WI-FI cell.

Exemplary embodiments of the disclosure comprise methods of WI-FI/3GPP access selection between a first access network (e.g., WLAN) and a second access network (e.g., 3GPP cellular network) providing overlapping coverage with the first access network. In one exemplary embodiment, a performance measurement (e.g., average throughout) is obtained for a group of one or more cells in the second access network that are correlated with a cell in the first network. An admission threshold is computed for the cell in the first access network based on the performance measurement for the corresponding group of cells in the second access network that are correlated with the cell in the first access network. Admission of a user terminal operating in the second access network to the cell in the first access network is controlled based on the admission threshold.

In one exemplary embodiment, the admit threshold comprises a minimum received signal strength for the user terminal allowed by the cell in the first access network.

In some embodiments, computing the admission threshold based on a performance measurement comprises computing the admission threshold based on an average throughput for the group of cells in the second access network.

In some embodiments, computing the admission threshold based on an average throughput for the group of cells in the second access network comprises computing the admission threshold as a function of the average throughput of the cell in the first access network and the average throughput for the group of cells in the second access network.

In some embodiments, computing the admission threshold as a function of the average throughput of the cell in the first access network and the average throughput for the group of cells in the second access network comprises applying a adjustable bias factor to favor one of the first and second access networks.

In some embodiments, computing an average throughput for the group of cells in the second access network comprises computing a weighted average throughput for the group of cells in the second access network.

In some embodiments, computing a weighted average throughput for the group of cells in the second access network comprises computing a weighting factor for each cell in the group of cells, computing a weighted sum of the individual cell throughputs based on the weighing factors, and dividing the weighted sum by the number of cells in the group of cells.

In some embodiments, computing a weighting factor for each cell in the group comprises computing the weighting factors based on hit counts.

In some embodiments, the group of cells in the second network comprises cells of two or more different types, and the hit counts for cells of different types are multiplied by corresponding bias factors based on cell type.

In some embodiments of the invention, computing an admission threshold is further based on the cell loads or other network conditions in the first and second access networks.

In some embodiments, computing the admission threshold is carried out at a central access control node in the first access network.

In some embodiments, controlling the admission of a user terminal operating in the second access network to the cell in the first access network based on the admission threshold comprises sending the admission threshold from the centralized access control node to an access point serving the cell in the first access network.

In some embodiments, obtaining a performance measurement for a group of one or more cells in the second access network that are correlated with the cell in the first network comprises sending a request from the access control node in the first access network to a network node in the second access network; receiving, responsive to the request, performance statistics for the group of cells in the second access network correlated with the cell in the first access network; and computing the performance measurement based on the performance statistics.

In some embodiments, the method further comprises correlating the group of one or more cells of the second access network with the cell in the first access network.

In some embodiments, correlating the group of one or more cells of the second access network with the cell in the first access network comprises sending a cell identification request from the first access network to the second access network, the cell identification request including a user terminal identification of a user terminal connected to the cell in the first access network; receiving, responsive to the cell identification request, a cell identification of a last known cell in the second access network in which the user terminal was present; and correlating the received cell identification with the cell in the first access network.

In some embodiments, the admission threshold for the cell in the first access network is computed by an access point for the cell in the first access network.

In some embodiments, controlling the admission of a user terminal operating in a cell of the second access network to the cell in the first access network based on the admission threshold comprises measuring a received signal strength of a signal received from a user terminal attempting to access the cell in the first access network; admitting the user terminal to the cell in the first access network based on a comparison of the received signal strength with the admission threshold.

In some embodiments, the method further comprises silently rejecting the attempt by a user terminal to connect to the first cell by ignoring connection requests to the access point.

In some embodiments, obtaining a performance measurement for a group of one or more cells in the second access network that are correlated with the cell in the first network comprises receiving performance statistics for the group of cells in the second access network correlated with the cell in the first access network; and computing the performance measurement based on the performance statistics.

In some embodiments of the invention, the method further comprises using an adaptive control loop to continuously adjust the admission threshold based on current conditions and monitoring the results. For example, the adaptive control loop may re-compute the admission threshold at predetermined intervals or as conditions in the two access networks change.

Exemplary embodiments of the disclosure comprise a network node in a first access network configured to control access selection by a user terminal between a first access network (e.g. WLAN) and a second access network (e.g. cellular network) providing overlapping coverage with the first access network. In one exemplary embodiment, the network node includes a network interface and processing circuit. The processing circuit is configured to obtain a performance measurement (e.g., average user terminal throughput) for a group of cells in the second access network that are correlated with the cell in the first access network. The processing circuit is further configured to compute an admission threshold for the cell in the first access network based on the performance measurement for the group of cells in the second access network, and to control admission of a user terminal operating in the second access network to the cell in the first access network based on the admission threshold.

In one exemplary embodiment, the admission threshold comprises a minimum received signal strength (RSSI) for the user terminal allowed by the cell in the first access network.

In some embodiments, the processing circuit is configured to compute the admission threshold based on an average throughput for the group of cells in the second access network.

In some embodiments, the processing circuit is configured to compute the admission threshold as a function of the average throughput for the group of cells in the second access network and the average throughput of the cell in the first access network.

In some embodiments, computing the admission threshold by the processing circuit further comprises applying bias factors to favor one of the first and second access networks.

In some embodiments of the invention, computing the admission threshold by the processing circuit further comprises computing the admission threshold based on cell load factors or other network conditions in the first and second access networks.

In some embodiments, computing an average throughput for a group of cells in the second access network by the processing circuit comprises computing a weighted average throughput for the group of cells in the second access network.

In some embodiments, computing a weighted average throughput for the group of cells in the second access network by the processing circuit comprises computing a weighting factor for each cell in the group, computing a weighted sum of the individual cell throughputs based on the weighing factors, and dividing the weighted sum by the number of cells in the group of cells.

In some embodiments, computing a weighting factor for each cell in the group by the processing circuit comprises computing the weighting factors based on hit counts.

In some embodiments, the group of cells in the second network comprises cells of two or more different types, and the processing circuit is configured to multiply the hit counts for cells of different types by corresponding bias factors based on cell type.

In some embodiments, network node comprises a centralized access control node configured to compute admission thresholds for two or more cells in the first access network.

In some embodiments, to control the admission of a user terminal operating in a cell of the second access network to the cell in the first access network based on the admission threshold, the processing circuit is configured to send the admission threshold from the centralized access control node to an access point.

In some embodiments, to obtain a performance measurement for a group of one or more cells in the second access network that are correlated with the cell in the first network, the processing circuit is configured to send a request from the access control node in the first access network to a network node in the second access network; receive, responsive to the request, performance statistics for the group of cells in the second access network correlated with the cell in the first access network; and compute the performance measurement based on the performance statistics.

In some embodiments, the processing circuit is further configured to correlate the group of one or more cells of the second access network with the cell in the first access network.

In some embodiments, to correlate the group of one or more cells of the second access network with the cell in the first access network, the processing circuit is configured to send a cell identification request from the first access network to the second access network, the cell identification request including a user terminal identification of a user terminal connected to the cell in the first access network; receive, responsive to the cell identification request, a cell identification of a last known cell in the second access network in which the user terminal was present; and correlate the received cell identification with the cell in the first access network.

In some embodiments, the network node comprises an access point in a cell of the first access network.

In some embodiments, to control the admission of a user terminal operating in a cell of the second access network to the cell in the first access network based on the admission threshold, the processing circuit is configured to measure a received signal strength of a signal received from a user terminal attempting to access the cell in the first access network; and admit the user terminal to the cell in the first access network based on a comparison of the received signal strength to the admission threshold.

In some embodiments, the processing circuit is further configured to silently reject the attempt by a user terminal to connect to the first cell by ignoring data transmissions from the user terminal to the access point.

In some embodiments, to obtain a performance measurement for a group of one or more cells in the second access network that are correlated with the cell in the first network, the processing circuit is configured to receive performance statistics for the group of cells in the second access network correlated with the cell in the first access network; and compute the performance measurement based on the performance statistics.

In some embodiments, the processing circuit is configured to implement an adaptive control loop to continuously adjust the admit threshold based on current conditions and monitor the results. For example, the adaptive control loop may re-compute the admission threshold at predetermine intervals or as conditions in the two access networks change.

Other embodiments of the disclosure comprise methods of correlating cells in first and second access networks that provide overlapping coverage. The method is performed when a user terminal attempts to connect to a cell in the first access network. The method comprises sending a cell ID request from the first access network to the second access network. The cell identification request includes a user terminal identification of a user terminal connected to a cell in the first access network. The method further comprises receiving, responsive to the cell ID request, a cell ID of a last known cell in the second access network in which the user terminal was present. The received cell ID is then correlated with a connecting cell in the first access network.

In some embodiments, the method further comprises receiving the user identification of the user terminal from an authentication server.

In some embodiments, the cell correlation process is performed on an on-going basis in order to detect changes in network configuration.

In some embodiments of the invention, the cell correlation information is stored in a cell correlation table.

Other embodiments of the disclosure comprise a network node including a network interface circuit and processing circuit for correlating cells in first and second access networks that provide overlapping coverage. In one exemplary embodiment, the processing circuit is configured to send a cell ID request to the second access network; receive, responsive to the cell ID request, a cell ID of a last known cell in the second access network in which the user terminal was present; and correlate the received cell ID with a connecting cell in the first access network.

In some embodiments, the processing circuit if further configured to receive the user identification from an authentication server.

In some embodiments, the processing circuit is configured to perform the cell correlation process on an on-going basis in order to detect changes in network configuration.

In some embodiments of the invention, the processing circuit is configured to store the cell correlation information in a cell correlation table.

Other embodiments of the disclosure comprise methods of determining a user terminal identity (e.g., IMSI) in a second access network by a first access network and of associating the user terminal identity in the second access network with the corresponding identity in the first access network.

Other embodiments of the disclosure comprise a network node (e.g., OSSRC) including a network interface circuit and processing circuit for determining a user terminal identity (e.g. IMSI) in a second access network (e.g., cellular network) by a first access network (e.g., WLAN) and of associating the user terminal identity in the second access network with the corresponding identity in the first access network.

DETAILED DESCRIPTION

The present disclosure describes techniques for steering traffic between two different access networks. The techniques described herein are generally applicable to any type of wireless communication network. As an aid in understanding the disclosure, exemplary embodiments of the steering techniques will be described in the context of WI-FI/3GPP access selection between a cellular network and a wireless network based on the Institute of Electrical and Electronics Engineers (IEEE) 802.11 family of standards.

Figure 1:
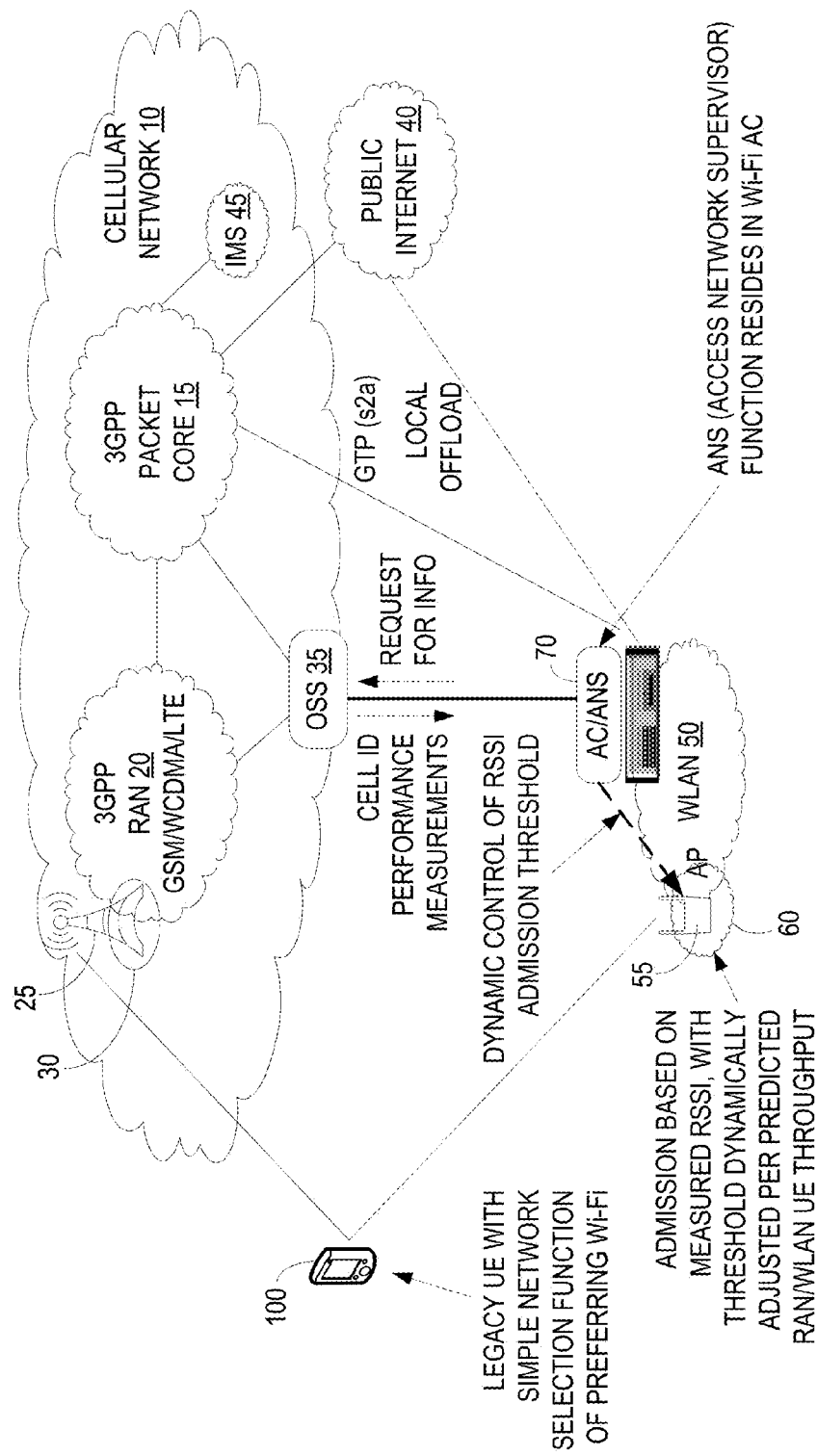
FIG. 1 illustrates a communication network implementing the traffic steering approach as described herein.

FIG. 1 illustrates an exemplary communication environment comprising first and second access networks in which the access selection techniques may be employed. The first access network comprises a Wireless Local Area Network (WLAN) 50 operating according to the IEEE 802.11 family of standards. The WLAN 50 includes one or more access points (APs) 55 that provide coverage in respective WI-FI cells 60. A single AP 55 may serve multiple WI-FI cells 60. The second access network comprises a cellular network 10, such as a Global System for Mobile Communication (GSM) network, Wideband Code Division Multiple Access (WCDMA) network, Long Term Evolution (LTE) network, or other cellular network. The cellular network 10 includes a packet core network 15 and radio access network (RAN) 20. The RAN 20 includes one or more base stations (BSs) 25 that provide coverage in respective cells 30 of the cellular network 10. A single base station 25 may serve multiple cellular network cells 30. The packet core network 15 provides connection to external networks, such as the Internet 40 and IP Multimedia Subsystem (IMS) networks 45.

A dual mode user terminal 100 is also shown that is capable of communicating with both the base stations 25 in the cellular network 10 and the APs 55 in the WLAN 50. The user terminal 100 is identified in the cellular network 10 by an International Subscriber Identity (IMSI). The user terminal 100 is identified in the WLAN 50 by a Medium Access Control (MAC) address.

The WLAN 50 includes an Access Control (AC) node 70 with an Access Network Supervisor (ANS) function that controls admission to the WLAN 50. The AC node 70 communicates with an Operation and Support System (OSS) 35 in the cellular network 10 as will be hereinafter described in more detail. Although shown separately, the OSS 35 may be located in the core network 15 of the cellular network 10. In one exemplary embodiment, the AC node 70 sends requests for information to the OSS 35. For example, the AC node 70 may request a cell ID or performance measurements for a cellular network cell 30 or a group of cells. In response to the request for information, the OSS 35 may send the requested information to the AC node 70.

Figure 2:
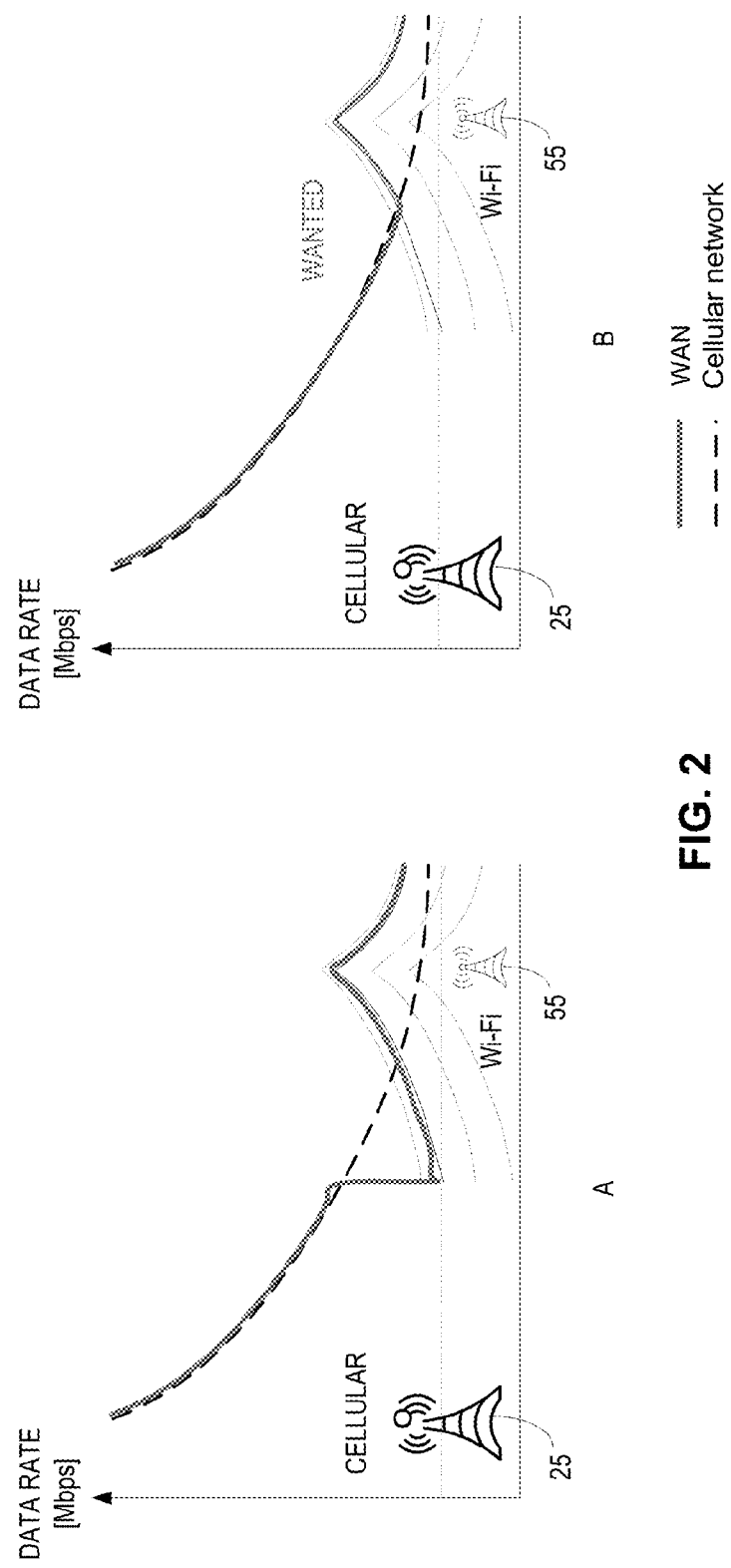
FIGS. 2A and 2B illustrate switching by a user terminal between a cellular network cell and WI-FI cell.

FIG. 2A illustrates the current traffic steering approach in use today where a user terminal 100 favors a WLAN connection over a cellular network connection. A user terminal 100 having a cellular network connection will switch to a WI-FI cell 60 as soon as it is able to connect to the WI-FI 60 cell even though the cellular network 10 provides higher throughput than the WLAN 50. There is no coordination between the cellular network 10 and the WLAN 50. The immediate switching to the WI-FI cell 60 by the user terminal 100 as soon as it is able to establish a connection with the WI-FI cell 60 results in a significant drop in data throughput for the user terminal 100. This approach becomes more problematic with the increasing number of WI-FI cells 60.

FIG. 2B illustrates an alternative approach according to one embodiment of the disclosure. As shown in FIG. 2B, the user terminal 100 does not immediately switch to the WI-FI cell 60 as soon as it is able to establish a connection to the WI-FI cell 60. Rather, switching from the cellular network 10 to the WI-FI cell 60 is based on expected performance of the WI-FI Cell 60 relative to the cellular network cell 30. In one embodiment, switching from the cellular network 10 to the WI-FI cell 60 is delayed until the data throughput for the WI-FI cell 60 is roughly equal to the data throughput for cellular network 10. This approach provides a better experience for the user.

The traffic steering in one embodiment has two major components. First, the cellular network cells 30 providing overlapping coverage with a WI-FI cell 60 are identified and correlated with the WI-FI cell 60. Second, adaptive steering control is provided by adjusting a Received Signal Strength Indicator (RSSI) threshold used for admitting user terminals 100 to the WI-FI cell 60. The threshold is referred to herein as the RSSI-Admit threshold or admission threshold.

The cellular network cells 30 may, for example, comprise GSM cells, WCDMA cells, LTE cells, or a combination thereof. In one embodiment, up to nine cellular network cells 30 can be correlated with a single WI-FI cell 60. Any additional cellular network cells 30 of lesser significance are ignored. The correlation of cellular network cells 30 to WI-FI cells 60 is performed automatically on an ongoing basis so that changes in network configuration are detected and accounted for. Changes in network configuration may, for example, be due to cell splitting, addition of cells, deletion of cells, etc.

The RSSI-Admit threshold is used to control the effective coverage area or effective size of a WI-FI cell 60. A user terminal 100 is admitted when the RSSI-Admit threshold is met and is not admitted otherwise. Lowering the RSSI-Admit threshold increases the effective coverage area of the WI-FI cell 60. Raising the RSSI-Admit threshold decreases the effective coverage area of the WI-FI cell 60.

The adjustment of the RSSI-Admit threshold may be performed for all WI-FI cells 60 in the WLAN 50 by a centralized access control (AC) node 70 in the WLAN 50. Alternatively, each AP 55 in the WLAN 50 network may separately determine the RSSI-Admit threshold for WI-FI cells 60 served by the AP 55.

Predicted average throughput for the WI-FI cell 60 is used to set the RSSI-Admit threshold and thus control the effective cell size. In one exemplary embodiment, the RSSI-Admit threshold is set so that the predicted average throughput for the WI-FI cell 60 is roughly equal to the cellular network cell 30. In some embodiments, a carrier configurable bias may be used to allow a carrier to favor either the cellular network 10 connection or the WLAN 50. The bias can be dynamically adjusted depending on current conditions. For example, when the cellular network 10 is congested, the carrier may favor the WLAN 50 over the cellular network 10 to reduce the load on the cellular network 10. When the load in the cellular network 10 is light, the carrier may want to favor the cellular network 10.

Figure 3:
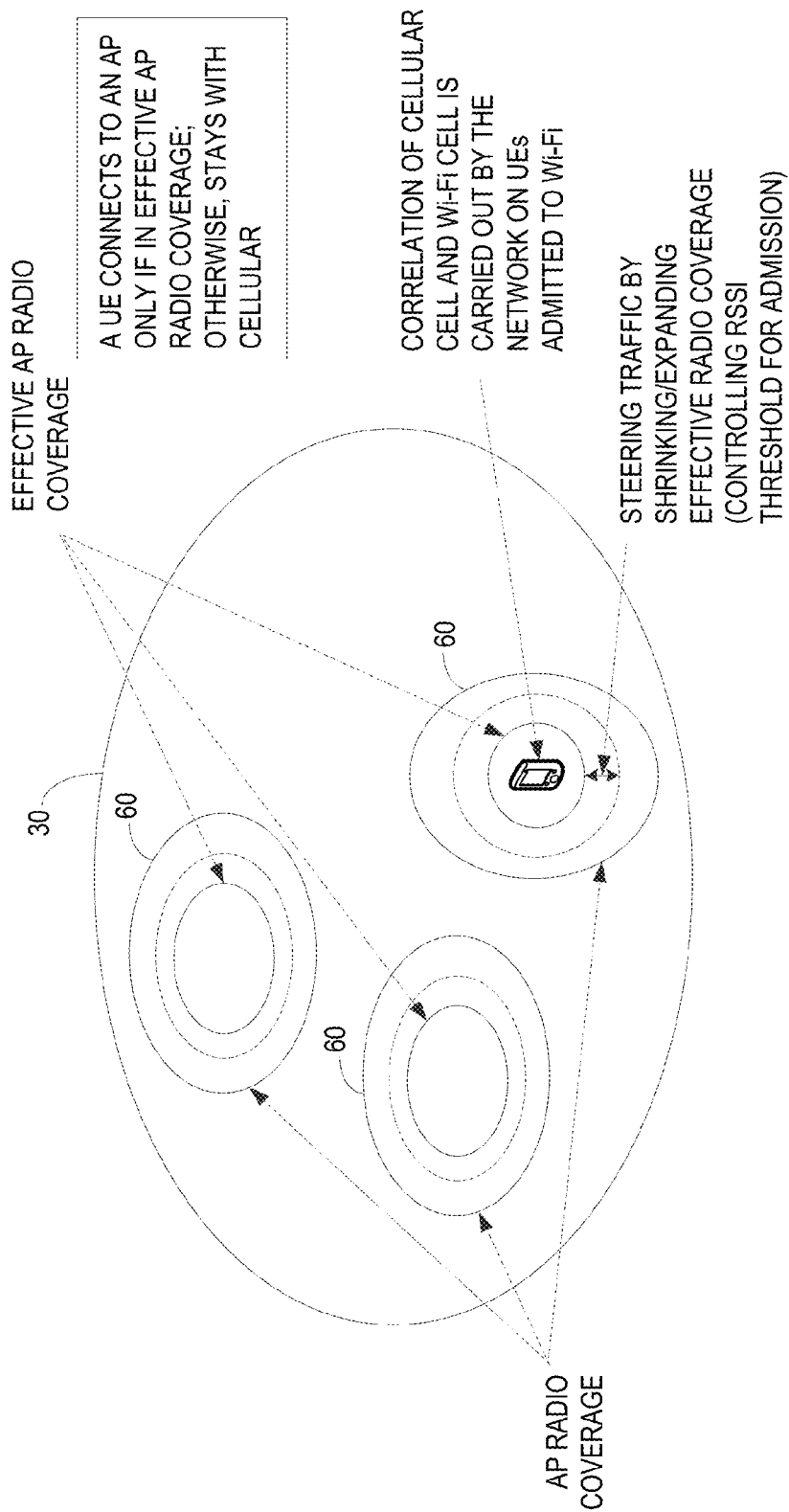
FIG. 3 illustrates the WI-FI/3GPP access selection approach based on use of an admission threshold to control the effective size of a WI-FI cell.

FIG. 3 illustrates how the RSSI-Admit threshold is used to control access selection. FIG. 3 shows the actual radio coverage area (RCA) of three WI-FI cells 60 within the coverage area of a cellular network cell 30. Each WI-FI cell 60 also has an effective coverage area (ECA) that is determined by the RSSI-Admit threshold. A user terminal 100 is admitted to the WI-FI cell 60 only if the user terminal 100 is within the effective coverage area as determined by the RSSI-Admit threshold. As shown in FIG. 3, the RSSI-Admit threshold can be adjusted dynamically to vary the effective coverage area of the WI-FI cell 60. The effective coverage area may be increased by lowering the RSSI-Admit threshold, which will increase the number of user terminals 100 admitted to the WI-FI cell 60. Conversely, the effective coverage area may be decreased by lowering the RSSI-Admit threshold, which will decrease the number of user terminals 100 admitted to the WI-FI cell 60.

Figure 4:
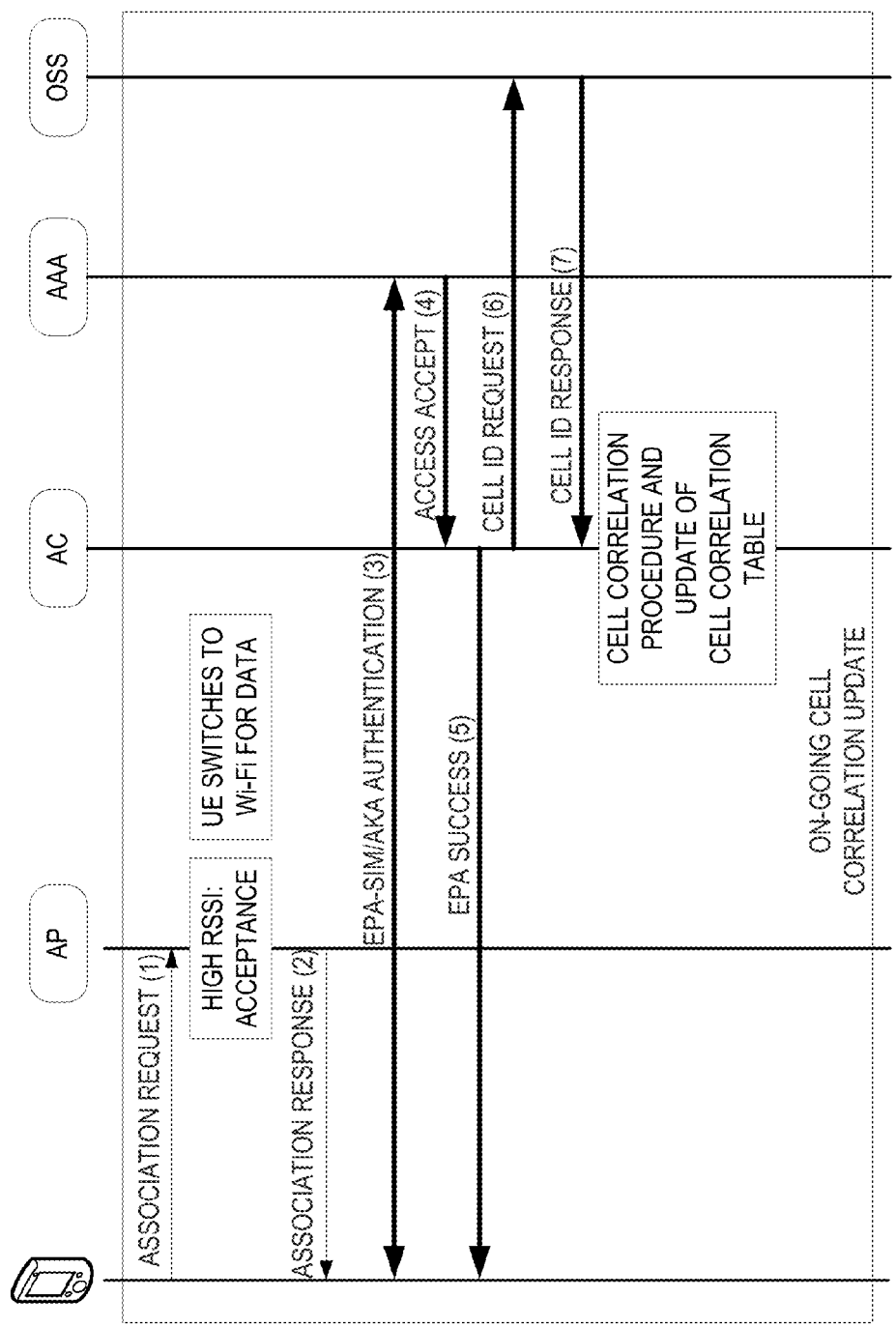
FIG. 4 illustrates an exemplary method of correlating cellular network cells with WI-FI cells.

FIG. 4 illustrates signaling involved in the correlation of cellular network cells 30 to WI-FI cells 60. A user terminal 100 sends an association request to the AP 60 in a WI-FI cell 60 to switch its connection from a cellular network cell 30 to the WI-FI cell 60 (step 1). In this example, it is assumed that the RSSI is high and that the association request is accepted. In this case, the AP 55 in the WI-FI cell 60 sends an association response to the user terminal 100 (step 2). The user terminal 100 then initiates an authentication procedure with an Authentication, Authorization, and Accounting (AAA) server 65 in the WLAN 50 (step 3). The authentication procedure may, for example, use the Extensible Authentication Protocol Subscriber Identity Module (EAP-SIM) method or the Authentication and Key Agreement (AKA) authentication method. If the user terminal 100 is successfully authenticated by the AAA server 65, the AAA server 65 sends an Access Accept message to the AC node 70 in the WLAN 50 (step 4). The Access Accept message includes an authentication response message, such as on EAP Success message, and the IMSI of the user terminal 100. The AC node 70 associates the IMSI of the user terminal 100 with the MAC address of the user terminal 100. The AC node 70 then sends the authentication response message (e.g., EAP Success message) to the user terminal 100 to indicate successful authentication (step 5). Also, upon receipt of the Access Accept message from the AAA server 65, the AC node 70 sends a Cell Identification (ID) Request message to the OSS 35 (step 6). The Cell ID Request message includes the IMSI of user terminal 100 provided by the AAA server 65. In response to the Cell ID Request message, the OSS 35 sends a Cell ID Response message to the AC node (step 7). The Cell ID Response message includes the cell ID of the last known cell 30 in which the user terminal 100 was present. The AC node 70 then performs a cell correlation procedure to map the cell ID to the WI-FI cell 60 and update a cell correlation table stored and maintained by the AC node 70. The cell correlation table includes a list of WI-FI cells 60 and corresponding cell IDs for cellular network cells 30 that have been correlated with each WI-FI cell 60.

Table 1 below lists functions performed by the OSS 65 and AC node 70 related to cell mapping.

TABLE 1

Cell Correlation Requirements

| Node | Requirement | Comments |
|---|---|---|
| OSS | Create table with IMSI, Cell ID, Cell Type and Timestamp when mapping event are received | |
| OSS | Respond to IMSI->Cell ID mapping queries over a Google Buf based interface to AC with Latest Cell ID the user terminal was known to be in Type of the cell (GSM/WCDMA/LTE) Coordinated Universal Time (UTC) timestamp for latest time of validity UTC current time | Current time is used for AC to compensate for clock differences |
| AC | Select user terminals with IMSI availability to query for cell ID mapping with the following input: IMSI of the user terminal Basic Service Set Identification (BSSID) the user terminals is in | Must select appropriate time to query, taking into consideration event updating on OSS is delayed |
| AC | Create and maintain an AP->Cell ID mapping table Allow up to 9 cells to be mapped to an AP Calculate and maintain a weight on each mapped cell based on primary cell mapping count | Table updating may be once a day or twice a day. Cell weight is to be used in calculating weighted average of user terminal 100 average throughput |

Figure 5:
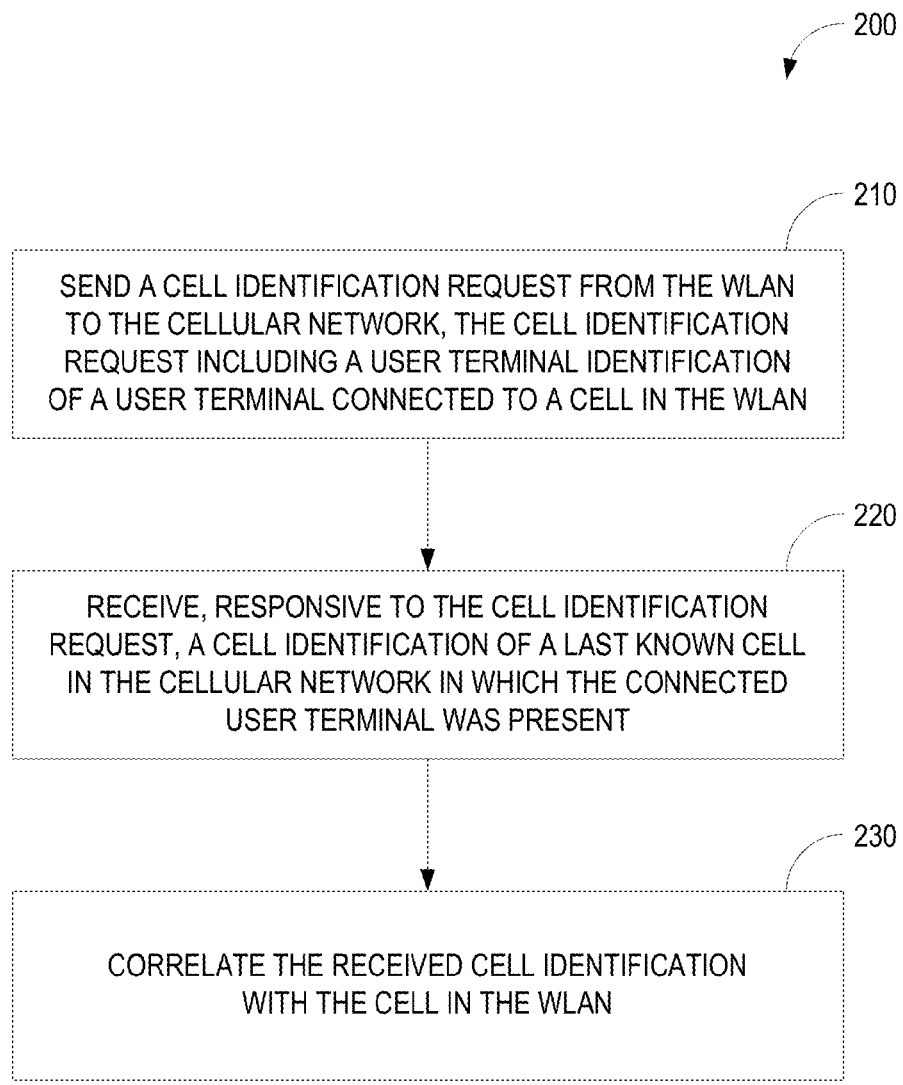
FIG. 5 illustrates a correlation method implemented by a network node in the WLAN.

FIG. 5 illustrates an exemplary cell correlation method 200 implemented by a network node in the WLAN 50 for correlating cells in first and second access networks. The network node may, for example, comprise an AC node 70 in the WLAN 50. The network node in the WLAN 50 sends a cell ID request to the cellular network 10 (block 210). The Cell ID request includes a user terminal ID (e.g., IMSI) that is used by the user terminal 100 in the cellular network 10. Responsive to the cell identification request, the network node receives a cell ID of a last known cell in the cellular network 10 in which the user terminal 100 was present (block 220). The network node in the WLAN 50 then correlates the received cell ID with a WI-FI cell 60 in the WLAN 50 to which the user terminal 100 is currently connected (block 230). The correlation may store in a cell correlation table (block 240).

Figure 6:
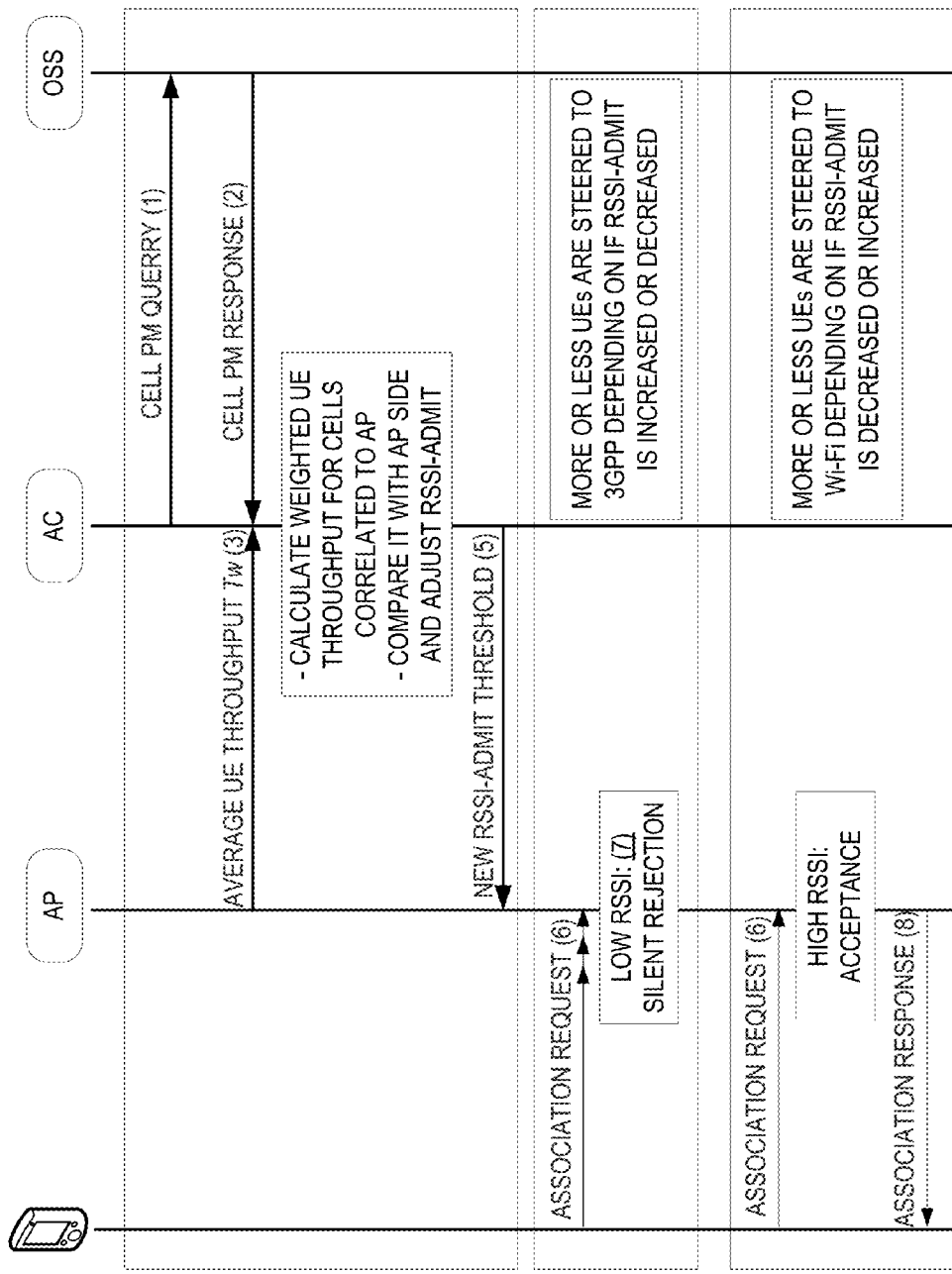
FIG. 6 illustrates an exemplary method of steering traffic between cellular network cells and WI-FI cells.

FIG. 6 illustrates signaling between the cellular network 10 and WLAN 50. The AC node 70 sends a Cell Performance Measurement (PM) Query to the OSS 35 to request performance measurements for the cellular network cells 30 correlated with the WI-FI cells 60 within its domain (step 1). The Cell PM Query includes the cell IDs of the cellular network cells 30 correlated with one or more WI-FI cells 60 in the WLAN 50. The Cell PM Query may be sent at periodic intervals (e.g., at 1 minute intervals), or may be event triggered. In response to the Cell PM Query, the OSS 35 sends the requested performance measurements for the identified cells to the AC node 70 (step 2). In one exemplary embodiment, the performance measurements comprise the average user terminal throughput $T_a$ for each cellular network cell 30 identified by the request. Alternatively, other performance data could be provided enabling the AC node 70 to compute the average user terminal throughput $T_a$ for each cellular network cell 30. The APs 55 in the WLAN 50 also calculate and report the average user terminal throughput $T_a$ at the same time interval for the respective WI-FI cells 60 in the WLAN 50. For each WI-FI cell 60, the AC node 70 calculates a weighted average user terminal throughput $T_a$ for the cellular network cells 30 correlated with each WI-FI cell 60 and compares it with the average user terminal throughput $T_a$ for the WI-FI cell 60 (step 4). Based on the comparison, the AC node 70 adjusts the RSSI-Admit threshold for the WI-FI cell 60 and sends the adjusted RSSI-Admit threshold to the AP 55 for the WI-FI cell 60 (step 5). The RSSI-Admit threshold is thereafter used by the AP 55 to control admission of user terminals 100 to the WI-FI cell 60. Equivalently, the AC node 70 could send the adjustment to the RSSI-Admit threshold to the AP 55 and the AP 55 could add the adjustment to the current RSSI-Admit threshold to obtain the new RSSI-Admit threshold. When the AP 55 receives a request message such as an Authentication Request, Probe Request, or association request from a user terminal 100 (step 6), the AP 55 measures the RSSI for the user terminal 100 and compares the measured RSSI to the RSSI-Admit threshold. If the measured RSSI is less than the threshold, the AP 55 silently rejects the user terminal 100 by dropping the received request messages (step 7). If the RSSI is above the threshold, the AP 55 sends a corresponding response message to the user terminal 100 (step 8).

Table 2 below provides further details regarding the functions performed by the OSS 35 and AC node 70 related to WI-FI/3GPP Access Selection.

TABLE 2

Access Selection Requirements

| Node | Requirement |
|---|---|
| OSS | Provide external SQL interface for AC to query performance measurements so as to derive average user terminal throughput |
| AC | Query performance measurements through SQL for deriving average user terminal throughput |
| AC | Calculate on-going daily trend of average user terminal throughput for each cell using actual data only |
| AC | Make a statistic prediction of current value of average user terminal throughput from a daily trend and the latest actual values |
| AC | Calculate a predicted current value of weighted user terminal throughput |
| AC | Adaptive RSSI-admit level control loop |
| AC | Communicate with AP to collect user terminal average throughput info and push new RSSI-Admit value to AP |

TABLE 2-continued

Access Selection Requirements

| Node | Requirement |
|------|-------------|
| AP | Calculate average user terminal throughput and communicate with AC for reporting. |
| AP | Execute commands from AC to activate new RSSI-Admit levels |

Figure 7:
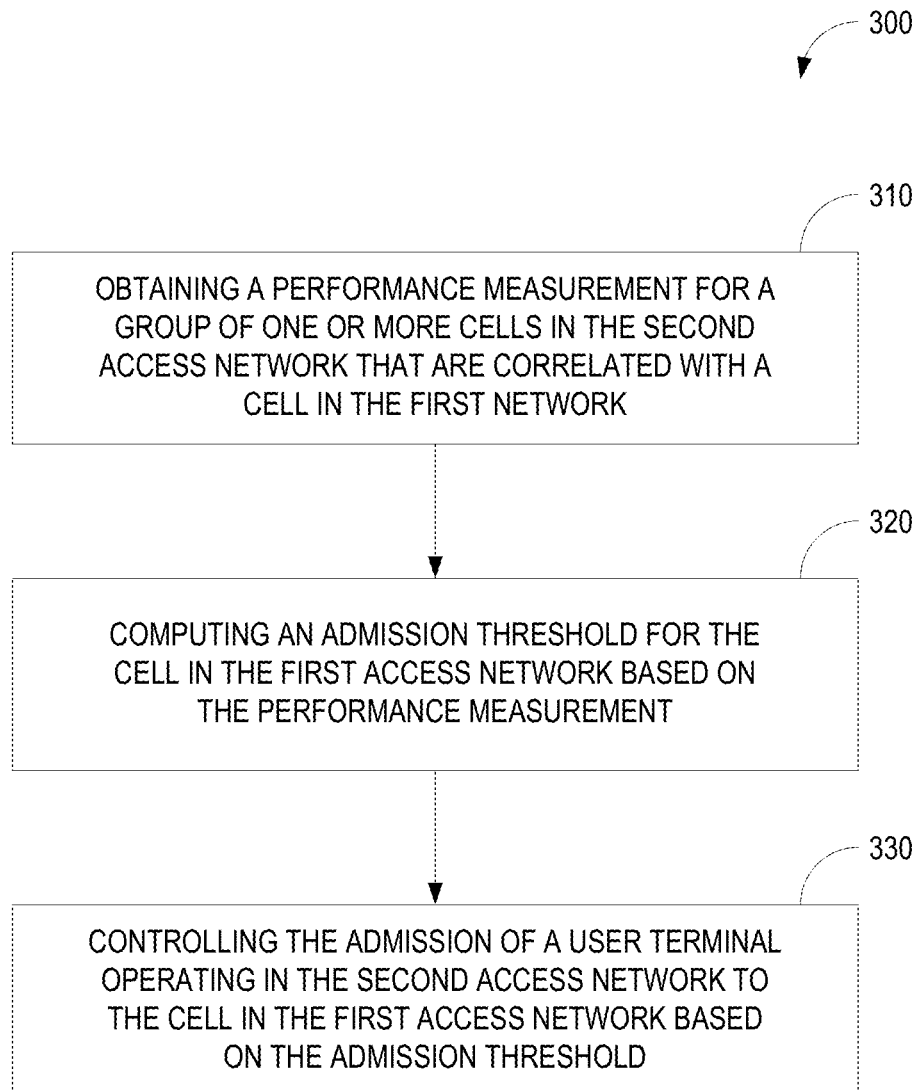
FIG. 7 illustrates a WI-FI/3GPP access selection method implemented in a WLAN.

FIG. 7 illustrates an exemplary method 300 of user network access selection between the WLAN 50 and a cellular network 10 that provides overlapping coverage with the WLAN 50. The method 300 may be performed by AC node 70 in the WLAN 50 or by an AP 55. A performance measurement is obtained for a group of cellular network cells 30 in the cellular network 10 that are correlated with a WI-FI cell 60 in the WLAN 50 (block 310). The performance measurement may, for example, comprise the aggregate average user terminal throughput, $T_c$, for the cellular network cells 30 that are correlated with the WI-FI cell 60. An admission threshold (e.g., RSSI-Admit threshold) for the WI-FI cell 60 is computed based on the performance measurement for the group of cellular network cells 30 in the cellular network 10 that are correlated with the WI-FI cell (block 320). Admission of user terminal 100 attempting to connect to the WI-FI cell 60 to the WLAN 50 is controlled based on the admission threshold for the WI-FI cell 60 (block 330).

In some embodiments, the AC node 70 correlates the group of one or more cells 30 in the cellular network 10 with a WI-FI cell 60 in the WLAN 50. The AC node 70 may obtain the performance measurement for the cells 30 in the cellular network 10 by requesting individual performance statistics (e.g., per cell average user terminal throughput, $T_a$) for the correlated cells 30 in the cellular network 10 and computing the performance measurement (e.g., aggregate average user terminal throughput, $T_c$) for the correlated cellular network cells 30 based on the individual performance statistics. The AC node 70 may further use the performance measurement to compute the admission threshold. To compute the admission threshold, the AC node 70 may also receive a performance measurement (e.g., average user terminal throughput, $T_w$) for the WI-FI cell 60 from the AP 55. The AC node 70 may further control the admission of user terminals 100 to the WI-FI cell 60 by sending the computed admission threshold to the AP 55. The AP 55 may then use the admission threshold to determine whether to admit user terminals 100 to the Wi-Fi cell 60. Alternatively, admission control decisions may be made by the AC node 70. In this case, the AP 55 may send RSSI measurements associated with a user terminal 100 to the AC node 70. The AC node 70 may decide whether to admit the user terminal 100 by comparing the RSSI measurements to the admission threshold.

In other embodiments, the AP 55 may receive the performance measurement (e.g., aggregate average user terminal throughput, $T_c$) of the correlated cellular network cells 30 from the AC node 70 and use the performance measurement to compute the admission threshold as previously described. Alternatively, the AP 55 may receive individual performance statistics (e.g., per cell average user terminal throughput, $T_a$) for correlated cells 30 in the cellular network 10 from either the AC node 70, or from the OSS 35 in the cellular network 10. The AP 55 in this embodiment may compute the performance measurement (e.g. aggregate average user terminal throughput, $T_a$) for the correlated cellular network cells 30 based on the performance statistics. In embodiments where the admission threshold is computed by the AP 55, the AP 55 may further control admission to the WI-FI cell 60 by comparing RSSI measurements for a user terminal 100 attempting to connect to the WI-FI cell 60 with the admission threshold.

Figure 8:
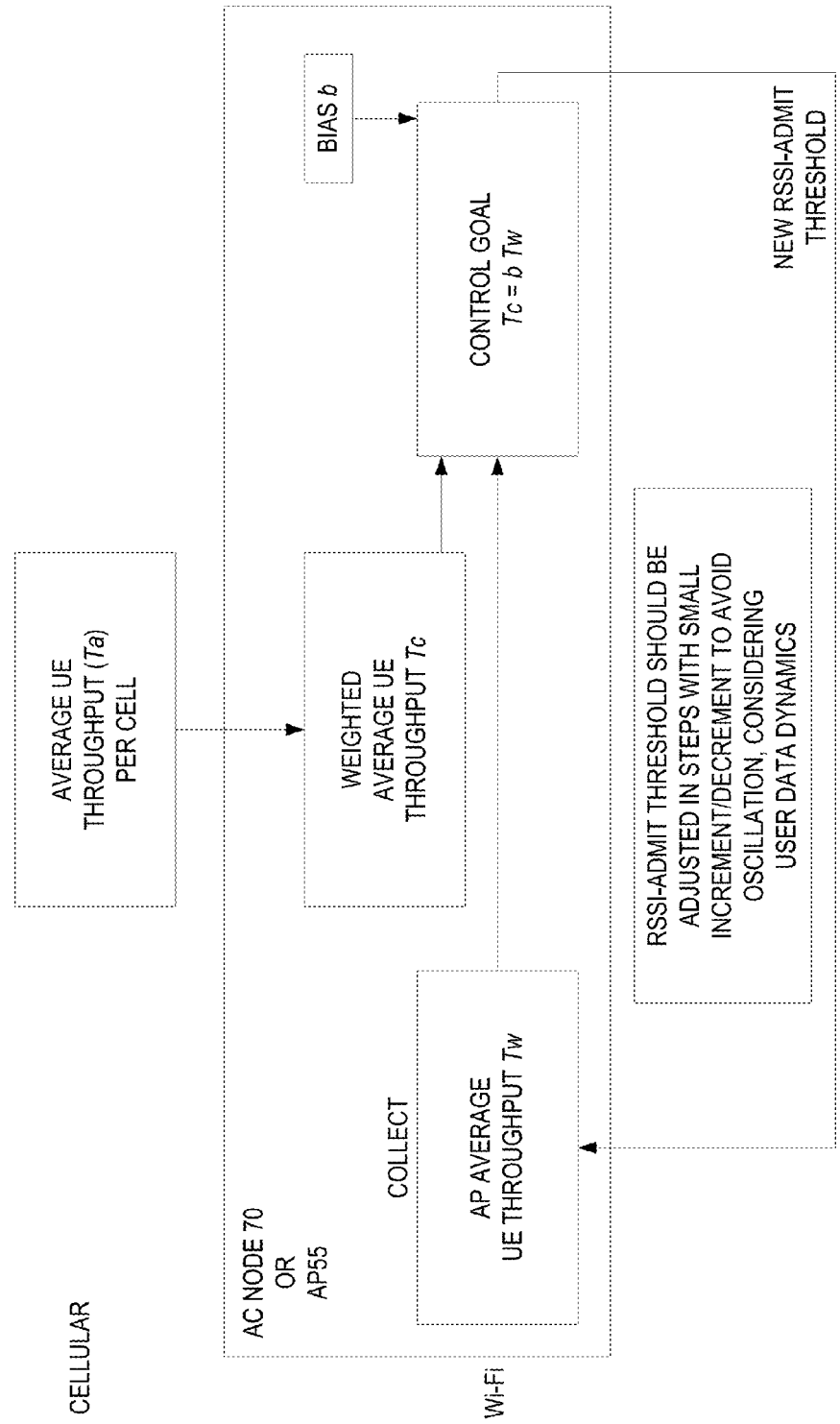
FIG. 8 illustrates exemplary processing performed by an access control node in a WLAN.

FIG. 8 illustrates an adaptive control loop for adjusting the admission threshold used for steering traffic between the cellular network 10 and WLAN 50. The average user terminal throughput $T_a$ for cellular network cells 30 correlated with a WI-FI cell 60 are input to a processing circuit within the AC node 70. The processing circuit computes the weighted average user terminal throughput, $T_c$ for the cells 30 of the cellular network 10 correlated with a WI-FI cell 60. The processing circuit receives the average user terminal throughput, $T_w$, for the WI-FI cell 60 from the AP 55. The processing circuit compares the weighted average throughput $T_c$ for the cellular network cells 30 with the average throughput $T_w$ of the WI-FI cell 60. The average user terminal throughput $T_w$ for the WI-FI cell 60 may be multiplied by a bias factor b. Based on the comparison, the processing circuit either increments or decrements the RSSI-Admit threshold. In one exemplary embodiment, the RSSI-Admit threshold is incremented or decremented in small steps to avoid oscillation. When the bias factor b is equal to 1, the RSSI-Admit threshold is incremented when $T_w$ is less than $T_c$ and decremented when $T_w$ is greater than $T_c$. A bias factor b greater than 1 favors the WI-FI cell 60, while a bias factor b less than 1 favors the cellular network 10. In one exemplary embodiment, a RSSI-Admit threshold is changed only when the difference between $bT_w$ and $T_c$ meets a threshold (e.g. 20% difference). The adjusted RSSI-admit threshold is provided to the AP 55.

For WCDMA networks, the weighted average user throughput $T_c$ may be computed from the average user throughputs $T_a(s)$ for the individual cellular network cells 30 according to:

$$T_c = \sum_{i=1}^{n} w_i T_a(i), \quad \text{Eq. (1)}$$

where n is the number of cellular network cells 30 correlated to the WI-FI cell 60, $w_i$ is a normalized weighting factor for the ith cellular network cell 30, and $T_a(i)$ is the average user terminal throughput of the ith cellular network cell 30. The weighting factor $w_i$ for cell i may be computed according to:

$$w_i = \frac{h_i}{\sum_{1}^{n} h} \quad \text{Eq. (2)}$$

where $h_i$ is the hit count for cell i and the summation in the denominator is the sum of the hit counts for cells 1 through n. The hit count $h_i$ for a cellular network cell 30 reflects the degree of overlap between the cellular network cell 30 and the WI-FI cell 60 and is computed based on number of times that a user terminal 100 moves from a given cellular network cell 30 to the WI-FI cell 60 in a given time interval (e.g., the past one hour or one day). The hit count $h_i$ is maintained by the AC node 70 for each cellular network cell 30 that is correlated with a WI-FI cell 60. In one exemplary embodiment, the hit count k for a cellular network cell 30 is incremented each time the cell ID of the cellular network cell 30 is returned by the OSS 35 in response to a Cell ID Request.

Because the hit counts $h_i$ for cellular network cells 30 in the different types of networks may not be directly comparable, the hit counts $h_i$ for the cellular network cells 30 may be multiplied by different bias factors depending on the type of the cellular network cells 30. The bias factor may comprise an integer between 1 and 10. A default bias factor of 1 may be used when not otherwise specified. The bias factors are applied to the hit counts before determining the weighting factors for the cellular network cells 30.

Figure 9:
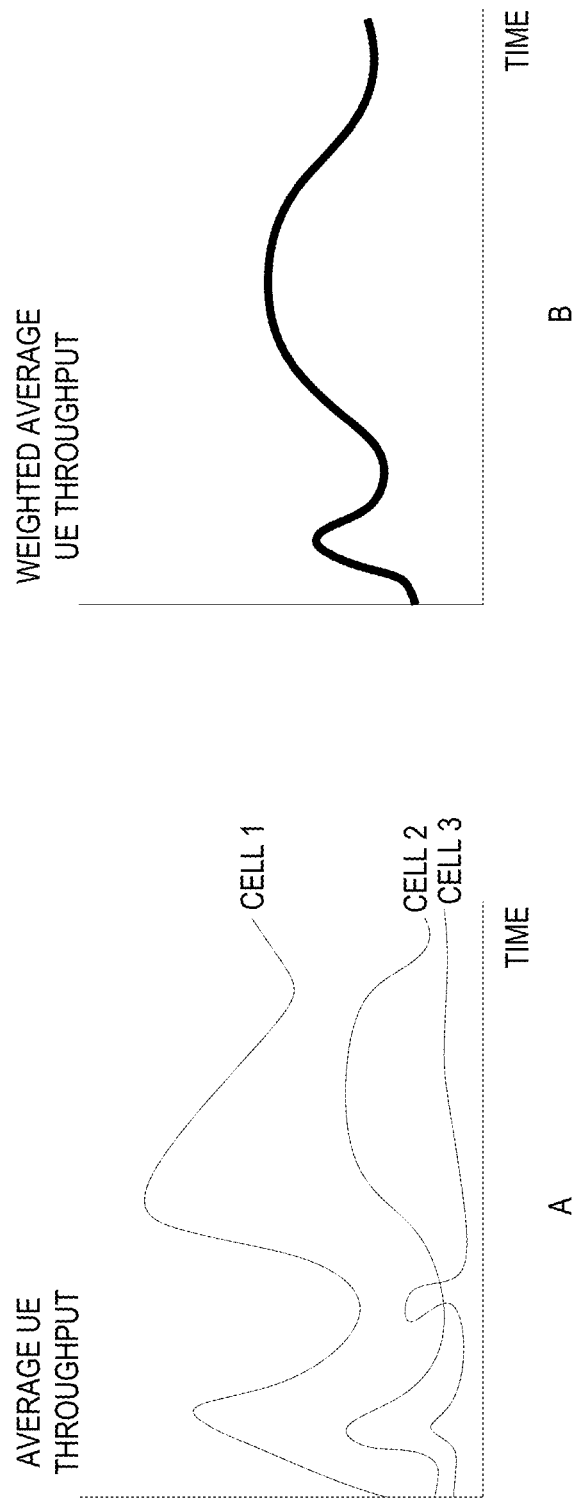
FIGS. 9A and 9B graphically illustrate a method of computing a weighted average user terminal throughput used for traffic steering.

FIGS. 9A and 9B graphically illustrates the weighted average for the cellular network cells 30 correlated with a WI-FI cell 60. FIG. 9A shows the average user terminal throughput for three cellular network cells 30 identified as Cell 1, Cell 2 and Cell 3. FIG. 9B shows a weighted average user terminal throughput for the same three cellular network cells 30.

To be comparable to the average user throughput for the cellular network cells 30, the average user terminal throughput for the WI-FI cell 60 is based on downlink (DL) data throughput. The downlink data throughput $T_d$ and the number of active users is measured and reported every one second. The average user terminal throughput $T_w$ is then calculated every one minute.

Those skilled in the art will appreciate that although the average user terminal throughput $T_a$ for a cellular network cell 30 and the average user throughput $T_w$ for a WI-FI cell 60 may be computed every minute, a longer time window may be used to compute the average. For example, the average user terminal throughputs $T_a$ and $T_w$ may be computed every one minute based on the traffic occurring over the last 15 minutes.

In actual practice, the latest measurements of the average user terminal throughputs $T_a(s)$ for the cellular network cells 30 available to the AC node 70 for computing the weighted average user terminal throughput $T_c$ may not always be current. The availability of the data may be delayed by as much as 45 minutes for a number of reasons.

According to one aspect of the present disclosure, a method is provided for predicting the current average user terminal throughput for individual cellular network cells 30 of the cellular network 10 in situations where the available data is not current. The predicted average user terminal throughput for a cell, denoted $\check{T}_a$, may then be used to compute the weighted average throughput $T_c$ by substituting the predicted average user terminal throughput $\check{T}_a$ for the average user terminal throughput $T_a$ in Eq. (1) to obtain:

$$T_c = \sum_{i=1}^{n} w_i \check{T}_a(i),\qquad \text{Eq. (3)}$$

Figure 10:
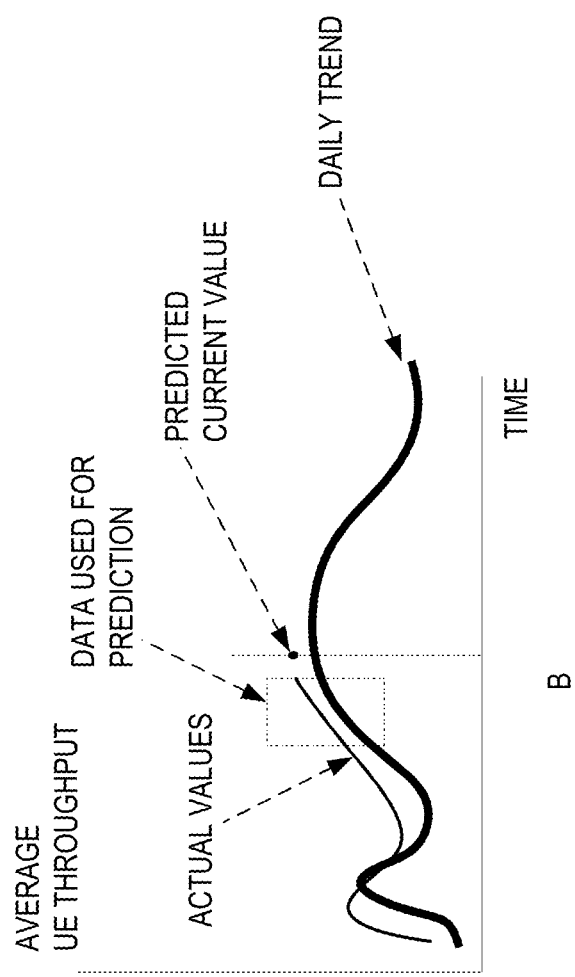
FIG. 10 illustrates a method of predicting a current user terminal throughput from historical data.

FIG. 10 graphically illustrates the prediction of the current average user terminal throughput $\check{T}_a$ for a cellular network cell 30 in one exemplary embodiment. In this embodiment, an on-going daily trend $T_{tr}$ is calculated for the average user terminal throughput. The latest average user terminal throughout $T_a$, together with the daily trend $T_{tr}$, is then used to predict the current user terminal throughput $\check{T}_a$.

In one exemplary embodiment, the daily trend is computed from the average user terminal throughput values collected over a period of days, weeks or months. The daily trend comprises a set of data points at different times t during a one day period. In one exemplary embodiment, the daily trend is computed every one minute by averaging $T_a$ at the same time t over a predetermined number of days. In one exemplary embodiment, the daily trend is computed over a 7 day time window. In some embodiments, a daily trend $T_{tr}$ may be calculated separately for weekdays, Saturday, and Sunday. Also, a separate daily trend $T_{tr}$ may be computed for each day of the week if the traffic varies significantly from day to day. A daily trend based on weekdays only is referred to herein as a weekday trend. A daily trend based on the same day of week over a plurality of weeks is referred to herein as a calendar day trend. For example, a daily trend based on data collected each Saturday over a plurality of Saturday is a calendar day trend. The daily trend $T_{tr}$ at time t is given by:

$$T_{tr}(t) = \frac{\sum_{1}^{n} T_a(t)}{n}\qquad \text{Eq. (4)}$$

where n is the number of days over which the daily trend is computed.

The most recent data for the average user throughput $T_a$ and the daily trend is used to predict a current value of the average user terminal throughput $\check{T}_a$. The most recent measurements of the average user terminal throughput $T_a$ are averaged over a predetermined time period (e.g. one hour) to obtain a composite average throughput $T_{avg}$ for the most recent time window. The daily trend is then averaged over the same time window to obtain an average of the daily trend $T_{tr\_avg}$. The difference between the current value of the daily trend $T_{tr\_current}$ at time t and the average of the daily trend $T_{tr\_avg}$ is computed to obtain $\Delta T_{tr}$. The predicted average user terminal throughout $\check{T}_a$ is given by:

$$\check{T}_a(t) = T_{avg} + \Delta T_{tr}\qquad \text{Eq. (5)}$$

Other ways of computing the predicated average user terminal throughput could also be used.

Although the prediction techniques described above were used to predict current average user terminal throughput, those skilled in the art will appreciate that the same techniques can be applied in other contexts and that the prediction techniques can be applied to other situation where the most recent available data is not current.

Figure 11:
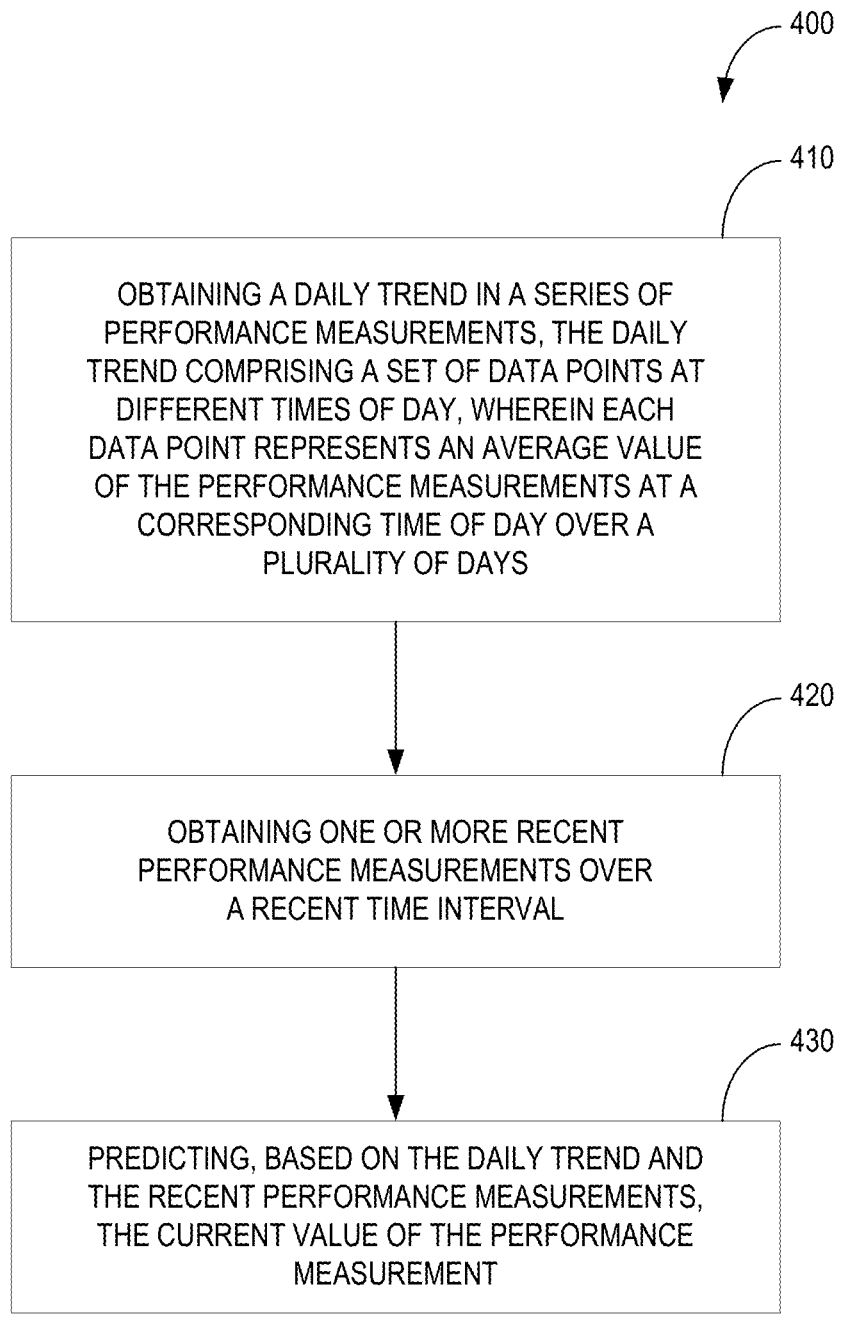
FIG. 11 illustrates an exemplary method of predicting a current value of a performance measurement.

FIG. 11 illustrates an exemplary method 400 implemented by an AC node 70 or other network node for predicting a current value of a performance measurement indicative of network performance. The AC node 70 or other network node obtains a daily trend in a series of performance measurements (block 410). The daily trend comprises a set of data points at different times of day, wherein each data point represents an average value of the performance measurements at a corresponding time of day over a plurality of days. The AC node 70 or other network node also obtains one or more recent performance measurements over a recent time interval (block 420). Based on the daily trend and the recent performance measurements, the AC node 70 or other network node predicts the current value of the performance measurement (block 430).

Figure 12:
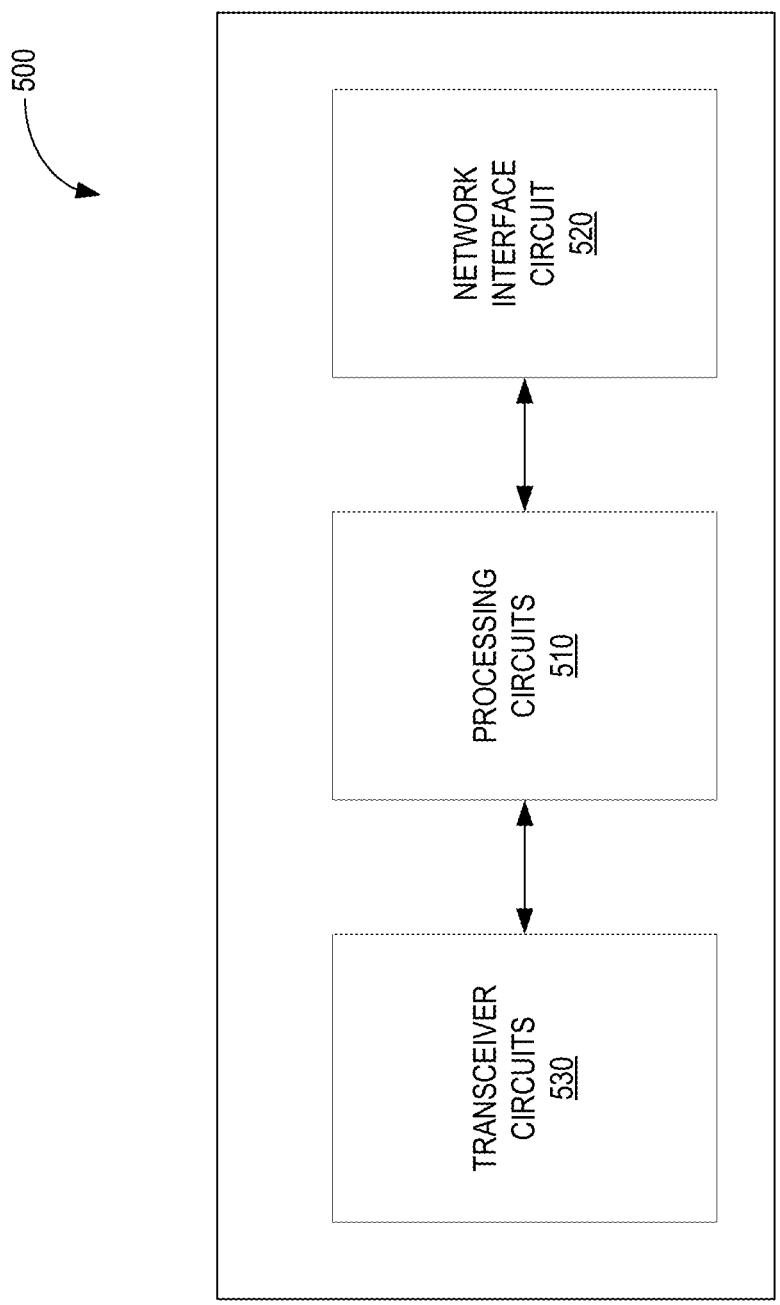
FIG. 12 illustrate an exemplary network node.

FIG. 12 illustrates an exemplary network node 500 for implementing traffic steering as herein described. The network node 500 comprises a network interface circuit 510 for connecting to a communication network and communicating over the network with other network nodes, and a processing circuit 520 configured to perform one or more of the methods described herein. In one embodiment, the network node 500 functions as an AC node 70 as herein described. In other embodiments, the network node 500 functions an AP 55 in the WLAN 50 as herein described and further includes a transceiver 530 for communicating with user terminals 100 over a radio interface. In other embodiments, the network node 200 comprises an OSS 35 in the cellular network 10 and the processing circuit 220 is configured to provide an AC node 70 or AP 55 in the WLAN 50 with cell IDs and performance statistics as herein described.

What is claimed is:

1. A method of controlling selection by a user terminal between a first access network and a second access network providing overlapping coverage with the first access network, the method comprising:
   obtaining a performance measurement comprising a throughput for a group of one or more cells in the second access network that are correlated with a cell in the first access network;
   computing an admission threshold for the cell in the first access network based on the throughput; and
   controlling the admission of a user terminal operating in the second access network to the cell in the first access network based on the admission threshold.

2. The method of claim 1 wherein the admission threshold comprises a minimum received signal strength for the user terminal allowed by the cell in the first access network.

3. The method of claim 1 wherein computing the admission threshold based on a throughput comprises computing the admission threshold based on an average throughput for the group of cells in the second access network.

4. The method of claim 3 wherein computing the admission threshold based on an average throughput for the group of cells in the second access network comprises computing the admission threshold as a function of the average throughput of the cell in the first access network and the average throughput for the group of cells in the second access network.

5. The method of claim 4 wherein computing the admission threshold as a function of the average throughput of the cell in the first access network and the average throughput for the group of cells in the second access network comprises applying an adjustable bias factor to favor one of the first and second access networks.

6. The method of claim 3 wherein computing an average throughput for the group of cells in the second access network comprises computing a weighted average throughput for the group of cells in the second access network.

7. The method of claim 6 wherein computing a weighted average throughput for the group of cells in the second access network comprises:
   computing a weighting factor for each cell in the group of cells;
   computing a weighted sum of the individual cell throughputs based on the weighing factors; and
   dividing the weighted sum by the number of cells in the group of cells.

8. The method of claim 7 wherein computing a weighting factor for each cell in the group comprises computing the weighting factors based on hit counts.

9. The method of claim 8 wherein the group of cells in the second network comprise cells of two or more different types, and wherein computing the weighting factors based on hit counts comprises multiplying the hit counts for cells of different types by corresponding bias factors based on cell type.

10. The method of claim 1 wherein computing an admission threshold is further based on the cell loads or other network conditions in the first and second access networks.

11. The method of claim 1 wherein computing the admission threshold for the cell in the first access network comprises computing the admission threshold by a centralized access control node in the first access network.

12. The method of claim 11 wherein controlling the admission of a user terminal operating in a cell of the second access network to the cell in the first access network based on the admission threshold comprises sending the admission threshold from the access control node to an access point for the cell in the first access network.

13. The method of claim 11 wherein obtaining a performance measurement for a group of one or more cells in the second access network that are correlated with the cell in the first network comprises:
   sending a request from the access control node in the first access network to a network node in the second access network;
   receiving, responsive to the request, performance statistics for the group of cells in the second access network correlated with the cell in the first access network;
   computing the performance measurement based on the performance statistics.

14. The method of claim 11 further comprising correlating the group of one or more cells of the second access network with the cell in the first access network.

15. The method of claim 14 wherein correlating the group of one or more cells of the second access network with the cell in the first access network comprises:
   sending a cell identification request from the first access network to the second access network, the cell identification request including a user terminal identification of a user terminal connected to the cell in the first access network;
   receiving, responsive to the cell identification request, a cell identification of a last known cell in the second access network in which the user terminal was present; and
   correlating the received cell identification with the cell in the first access network.

16. The method of claim 1 wherein computing the admission threshold for the cell in the first access network comprises computing the admission threshold by an access point for the cell in the first access network.

17. The method of claim 16 wherein controlling the admission of a user terminal operating in a cell of the second access network to the cell in the first access network based on the admission threshold comprises:
   measuring a received signal strength of a signal received from a user terminal attempting to access the cell in the first access network; and
   admitting the user terminal to the cell in the first access network based on a comparison of the received signal strength to the admission threshold.

18. The method of claim 17 further comprising silently rejecting the attempt by a user terminal to connect to the first cell by ignoring data transmissions from the user terminal to the access point.

19. The method of claim 16 wherein obtaining a performance measurement for a group of one or more cells in the second access network that are correlated with the cell in the first network comprises:
   receiving performance statistics for the group of cells in the second access network correlated with the cell in the first access network; and
   computing the performance measurement based on the performance statistics.

20. The method of claim 1 further comprising readjusting the admission threshold at predetermined intervals or as conditions in the two access networks change.

21. A network node in a first access network configured to control selection by a user terminal between the first access network and a second access network providing overlapping coverage with the first access network, the network node comprising:
   a network interface for communicating with other network nodes; and a processing circuit configured to:
   obtain a performance measurement comprising a throughput for a group of one or more cells in the second access network that are correlated with a cell in the first access network;
   compute an admission threshold for a cell in the first access network based on the throughput; and
   control the admission of a user terminal operating in the second access network to the cell in the first access network based on the admission threshold.

22. The network node of claim 21 wherein the admission threshold comprises a minimum received signal strength (RSSI) for the user terminal allowed by the cell in the first access network.

23. The network node of claim 21 wherein, to compute an admission threshold for the cell in the first access network based on a throughput, the processing circuit is configured to compute the admission threshold based on the average throughput for the group of cells in the second access network.

24. The network node of claim 23 wherein, to compute the admission threshold based on the average throughput for the group of cells in the second access network, the processing circuit is configured to compute the admission threshold further based on the average throughput of the cell in the first access network.

25. The network node of claim 24 wherein, to compute the admission threshold based on the average throughput for the group of cells in the second access network, the processing circuit is configured to apply bias factors to favor one of the first and second access networks.

26. The network node of claim 23 wherein, to compute an average throughput for a group of cells in the second access network, the processing circuit is configured to compute a weighted average throughput for the group of cells in the second access network.

27. The network node of claim 26 wherein, to compute a weighted average throughput for the group of cells in the second access network, the processing circuit is configured to:
   compute a weighting factor for each cell in the group;
   compute a weighted sum of the individual cell throughputs based on the weighing factors; and
   divide the weighted sum by the number of cells in the group of cells.

28. The network node of claim 27 wherein, to compute a weighting factor for each cell in the group, the processing circuit is configured to compute the weighting factors based on hit counts.

29. The network node of claim 28 wherein, to compute the weighting factors based on hit counts, the processing circuit is configured to multiply the hit counts for cells of different types by corresponding bias factors based on cell type.

30. The network node of claim 21 wherein, to compute the admission threshold based on a performance measurement for the group of cells in the second access network, the processing circuit is configured to compute the admission threshold further based on cell load factors or other network conditions in the first and second access networks.

31. The network node of claim 21 wherein the network node comprises a centralized access control node configured to compute the admission thresholds for two or more cells in the second access network.

32. The network node of claim 31 wherein, to control the admission of a user terminal operating in a cell of the second access network to the cell in the first access network based on the admission threshold, the processing circuit is configured to sending the admission threshold from the access control node to an access point.

33. The network node of claim 31 wherein, to obtain a performance measurement for a group of one or more cells in the second access network that are correlated with the cell in the first network, the processing circuit is configured to:
   send a request from the access control node in the first access network to a network node in the second access network;
   receive, responsive to the request, performance statistics for the group of cells in the second access network correlated with the cell in the first access network; and
   compute the performance measurement based on the performance statistics.

34. The network node of claim 21 wherein the processing circuit is further configured to correlate the group of one or more cells of the second access network with the cell in the first access network.

35. The network node of claim 21 wherein, to correlate the group of one or more cells of the second access network with the cell in the first access network, the processing circuit is configured to:
   send a cell identification request from the first access network to the second access network, the cell identification request including a user terminal identification of a user terminal connected to the cell in the first access network;
   receive, responsive to the cell identification request, a cell identification of a last known cell in the second access network in which the user terminal was present; and
   correlate the received cell identification with the cell in the first access network.

36. The network node of claim 21 wherein the network node comprises an access point in a cell of the second access network.

37. The network node of claim 36 wherein, to control the admission of a user terminal operating in a cell of the second access network to the cell in the first access network based on the admission threshold, the processing circuit is configured to:
   measure a received signal strength (RSSI) of a signal received from a user terminal attempting to access the cell in the first access network;
   admit the user terminal to the cell in the first access network based on a comparison of the received signal strength to the admission threshold.

38. The network node of claim 37 wherein the processing circuit is further configured to silently reject the attempt by a user terminal to make connection attempt to the First (WLAN) access network from the user terminal.

39. The network node of claim 36 wherein, to obtain a performance measurement for a group of one or more cells in the second access network that are correlated with the cell in the first network, the processing circuit is configured to:
   receive performance statistics for the group of cells in the second access network correlated with the cell in the first access network; and
   compute the performance measurement based on the performance statistics.

40. The network node of claim 21 wherein the processing circuit is configured to re adjust the admission threshold at predetermined intervals or as conditions in the two access networks change.

* * * * *